US008300673B2

(12) United States Patent
Hekmann et al.

(10) Patent No.: US 8,300,673 B2
(45) Date of Patent: Oct. 30, 2012

(54) SYSTEM, METHOD AND APPARATUS FOR MANAGING COMMUNICATION IN A PUBLIC SAFETY COMMUNICATION NETWORK

(75) Inventors: Ralf Hekmann, Chicago, IL (US); Robert J. Corke, Glen Ellyn, IL (US); Trefor J. Delve, Lake Zurich, IL (US); Daniel G. Prysby, Sleepy Hollow, IL (US); Christopher G. Ware, Heathcote (AU); Michael F. Zeleznik, LaGrange Park, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 899 days.

(21) Appl. No.: 11/844,669

(22) Filed: Aug. 24, 2007

(65) Prior Publication Data
US 2009/0052499 A1 Feb. 26, 2009

(51) Int. Cl.
*H04B 1/00* (2006.01)
(52) U.S. Cl. ........ 375/132; 375/130; 375/296; 375/133; 375/260; 370/319; 370/320; 370/321; 370/330; 370/345; 370/347; 370/335; 370/342; 455/561; 455/451
(58) Field of Classification Search .................. 375/132, 375/130, 296, 133, 260; 370/319, 320, 321, 370/330, 335, 342, 345, 347; 455/561, 451, 455/452
See application file for complete search history.

(56) References Cited

U.S. PATENT DOCUMENTS

| 6,501,785 B1* | 12/2002 | Chang et al. ............... 375/133 |
| 6,526,279 B1* | 2/2003 | Dent ........................... 455/437 |
| 7,079,568 B1* | 7/2006 | Boetzel et al. .............. 375/132 |
| 7,103,030 B2* | 9/2006 | Jones .......................... 370/343 |
| 2001/0046225 A1* | 11/2001 | Schwaller et al. .......... 370/343 |
| 2002/0080854 A1* | 6/2002 | Rebhan et al. ............. 375/132 |
| 2004/0142696 A1 | 7/2004 | Saunders et al. |
| 2005/0176420 A1* | 8/2005 | Graves et al. .............. 455/424 |
| 2006/0227852 A1* | 10/2006 | Black et al. ................. 375/133 |
| 2006/0233124 A1* | 10/2006 | Palanki ....................... 370/319 |

(Continued)

FOREIGN PATENT DOCUMENTS
EP WO2007009043 A1 1/2007

OTHER PUBLICATIONS

PCT International Search Report Application No. PCT/US2008/073802 Dated December 30, 2008—15 Pages.

(Continued)

*Primary Examiner* — Zewdu Kassa
(74) *Attorney, Agent, or Firm* — Barbara R. Doutre

(57) ABSTRACT

A method, system and apparatus for managing communication in a Public Safety Communication Network (PSCN). The PSCN includes a plurality of Mobile Stations (MSs) (110, 115, 120) and a master controller (105). The method includes initiating a communication between one or more MSs and the master controller using a primary channel (405). The primary channel corresponds to a primary frequency spectrum in the PSCN. The method further includes identifying one or more available channels in one or more of the primary frequency spectrum and a secondary frequency spectrum (410). Each of the primary frequency spectrum and the secondary frequency spectrum include one or more channels. Thereafter, a channel hopping pattern is generated for one or more MSs based on one or more available channels (415). The channel hopping pattern corresponds to a sequence of frequency hops for a MS.

29 Claims, 4 Drawing Sheets

U.S. PATENT DOCUMENTS

2007/0249341 A1* 10/2007 Chu et al. ............... 455/434
2010/0173586 A1* 7/2010 McHenry et al. ............ 455/62

OTHER PUBLICATIONS

ADAPT4: Cognitive Radio Public Safety Overlay Network Concept Dated March 21, 2006—26 Pages.

European Office Action for counterpart Application No. EPO8 798 332 mailed on Sep. 27, 2010.

International Preliminary Report on Patentability for International Application No. PCT/US2008/073802 mailed on Mar. 4, 2010.

* cited by examiner

SYSTEM, METHOD AND APPARATUS FOR MANAGING COMMUNICATION IN A PUBLIC SAFETY COMMUNICATION NETWORK

FIELD OF INVENTION

The invention relates generally to Public Safety Communication Networks (PSCN). More specifically, the invention relates to managing communication in a PSCN.

BACKGROUND OF THE INVENTION

Organizations such as Emergency Medical Services, Police, Fire brigade, and Coast Guard provide emergency services and respond to incidents that endanger people or property. Such organizations use a Public Safety Communication Network (PSCN) to provide communication to Mobile Stations (MSs).

Typically, in a PSCN one or more MSs communicate on a single pre-assigned channel. This use of a single pre-assigned channel in a PSCN, makes the PSCN susceptible to interference and intentional jamming. Some conventional techniques, for example, frequency hopping techniques mitigate effects of interference and intentional jamming. As telecommunication protocols defined for the PSCN limit communication of a MS to a single pre-assigned channel in the PSCN, the use of frequency hopping is not possible in the PSCN. Additionally, as telecommunication protocols remain unchanged for a long period of time the use of frequency hopping is not possible in the PSCN unless the telecommunication protocols defined for the PSCN are changed.

Accordingly there is a need for a method and system which can mitigate the effect of interference and intentional jamming in a PSCN.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION OF THE INVENTION

Figure 1:
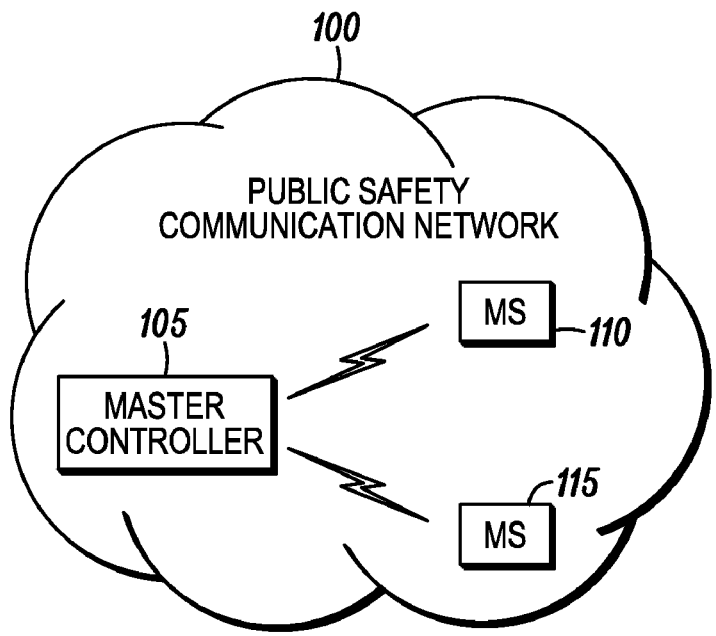
FIG. 1 is a block diagram showing a PSCN, in accordance with an embodiment of the invention.

Before describing in detail embodiments that are in accordance with the invention, it should be observed that the embodiments reside primarily in combinations of method steps and apparatus components related to a method, system, and apparatus for managing communication in a Public Safety Communication Network (PSCN). Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed.

Various embodiments of the invention provide a method, system, and apparatus for managing communication in a Public Safety Communication Network (PSCN). The PSCN includes a plurality of Mobile Stations (MSs) and a master controller. The method includes initiating a communication between one or more MSs and the master controller using a primary channel. The primary channel corresponds to a primary frequency spectrum in the PSCN. The method further includes identifying one or more available channels in one or more of the primary frequency spectrum and a secondary frequency spectrum used by another service provider. An example of another service provider may include but is not limited to a TV broadcaster. Further, each of the primary frequency spectrum and the secondary frequency spectrum include one or more channels. Thereafter, a channel hopping pattern is generated for one or more MSs based on one or more available channels. The channel hopping pattern corresponds to a sequence of frequency hops for a MS. A first predefined set of rules is used for generating the channel hopping pattern.

Briefly, in accordance with some embodiments of the invention, cognitive radio technology, which is intended to enable frequency sharing and reuse, is extended to provide frequency hopping to a wireless communication system, such as public safety communications system, that itself does not support frequency hopping technology.

FIG. 1 is a block diagram showing a PSCN 100, in accordance with an embodiment of the invention. Examples of the PSCN 100 may include, but are not limited to, a Hierarchically Structured Data (HSD) communication network, a High Performance Data (HPD) communication network, and a Tetra communication network. The PSCN 100 includes a master controller 105 and one or more MSs (for example, a MS 110 and a MS 115). Each MS uses a primary channel, which corresponds to a primary frequency spectrum in the PSCN 100, to initiate communication with the master controller 105. The primary frequency spectrum includes one or more channels.

The master controller 105 determines if each MS in the PSCN 100 is enabled to identify an available channel in one or more of the primary frequency spectrum and a secondary frequency spectrum used by another service provider. An example of another service provider may include but is not limited to a TV broadcaster. Further, an available channel is an unoccupied channel which is available for communication for a MS. A MS in the PSCN 100 is not licensed to use the secondary frequency spectrum. The secondary frequency spectrum includes one or more channels. If each MS in the PSCN 100 is enabled to identify an available channel, each MS identifies one or more available channels in one or more of the primary frequency spectrum and the secondary frequency spectrum.

The master controller 105 generates a channel hopping pattern for one or more MSs that have identified one or more available channels. The channel hopping pattern corresponds to a sequence of frequency hops for a MS. This is further explained in detail in conjunction with FIG. 4 and FIG. 6. The channel hopping pattern is generated based on one or more available channels, which are identified by each MS, using a first predefined set of rules. The channel hopping pattern generated using the first predefined set of rules minimizes interference in each of the primary frequency spectrum and the secondary frequency spectrum. A rule in the first predefined set of rules may be that identified available channels, which are consecutive in one of the primary frequency spectrum and the secondary frequency spectrum, are not consecutive in the channel hopping pattern. Additionally, a rule in the first predefined set of rules may be to maximize separation of the identified available channels, which are consecutive in one of the primary frequency spectrum and the secondary frequency spectrum, in the channel hopping pattern. The use of a secondary frequency spectrum of another service provider in conjunction with frequency hopping within the PSCN 100 improves the reliability of the primary connection while keeping bandwidth of the primary connection constant, in contrast to a cognitive radio enabled system where the secondary frequency spectrum is used to extend bandwidth.

Thereafter, based on the channel hopping pattern, each MS hops one or more frequencies. The master controller 105 may generate waveform modulation information along with the channel hopping pattern. The waveform modulation information may be used for modulating a transmission from a MS on a frequency allotted to the MS in the channel hopping pattern.

In an embodiment of the invention, the master controller 105 generates an encrypted message that corresponds to the channel hopping pattern. The master controller 105 communicates the encrypted message to each MS in the PSCN 100. A MS uses the encrypted message for generating a sequence of frequency hops for the MS. The sequence of frequency hops may be a pseudorandom sequence of frequencies. The encrypted message may include a generator polynomial which is common for one or more MSs in the PSCN 100. Alternately, the encrypted message may include a generator polynomial corresponding to each MS. A MS may use the generator polynomial for generating the sequence of frequency hops for the MS from the encrypted message. Thereafter, each MS uses the corresponding sequence of frequency hops for hopping one or more frequencies. This is further explained in detail in conjunction with FIG. 3.

Figure 2:
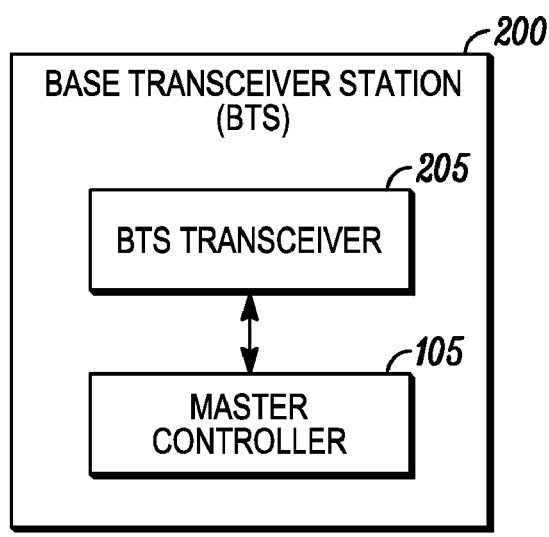
FIG. 2 is a block diagram showing a Base Transceiver Station (BTS) to manage communication for one or more Mobile Station (MS) in a PSCN, in accordance with an embodiment of the invention.

FIG. 2 is a block diagram showing a Base Transceiver Station (BTS) 200 for managing communication for one or more MSs in the PSCN 100, in accordance with an embodiment of the invention. The BTS 200 includes a BTS transceiver 205 and the master controller 105 operatively coupled to the BTS transceiver 205. The BTS transceiver 205 receives information from one or more MSs in the PSCN 100. The information corresponds to one or more available channels identified by one or more MSs. This has been explained in conjunction with FIG. 1.

The master controller 105 generates a channel hopping pattern for one or more MSs in the PSCN 100 based on the information corresponding to one or more available channels identified for each MS. The channel hopping pattern is generated using a first predefined set of rules. The first predefined set of rules has been explained in conjunction with FIG. 1. The channel hopping pattern corresponds to a sequence of frequency hops for a MS in the PSCN 100. The BTS transceiver 205 communicates the channel hopping pattern to one or more MSs in the PSCN 100. The master controller 105 may generate waveform modulation information along with the channel hopping pattern. The waveform modulation information may be used for modulating a transmission from a MS on a frequency allotted to the MS in the channel hopping pattern.

In an embodiment of the invention, the master controller 105 may generate an encrypted message. The BTS transceiver 205 communicates the encrypted message to the one or more MSs in the PSCN 100. The encrypted message is used by a MS for generating a sequence of frequency hops for the MS. This is further explained in conjunction with FIG. 3.

Figure 3:
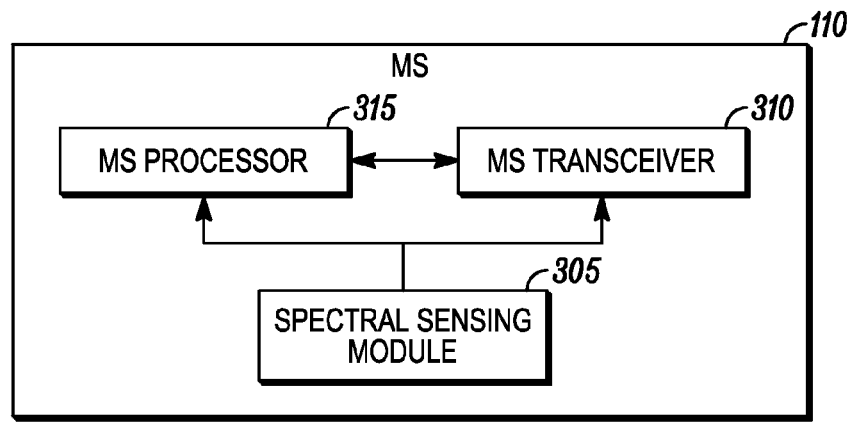
FIG. 3 is a block diagram showing a MS for managing communication in a PSCN, in accordance with an embodiment of the invention.

FIG. 3 is a block diagram showing the MS 110 for managing communication in the PSCN 100, in accordance with an embodiment of the invention. The MS 110 includes a spectral sensing module 305, a MS transceiver 310 operatively coupled to the spectral sensing module 305, and a MS processor 315 operatively coupled to each of the spectral sensing module 305 and the MS transceiver 310. Though not shown, it will be apparent to a person skilled in the art that the MS 115 also includes its own spectral sensing module, the MS transceiver, and the MS processor. The MS transceiver 310 initiates a communication with the master controller 105 on a primary channel in the primary frequency spectrum.

Thereafter, the spectral sensing module 305 identifies one or more available channels in one or more of the primary frequency spectrum and a secondary frequency spectrum of another service provider. The MS processor 315 may generate an available channel list based on one or more available channels identified by the spectral sensing module 305. The available channel list includes a set of available channels. The MS processor 315 generates the available channel list using a second predefined set of rules, such that a communication using the set of available channels minimizes interference in each of the primary frequency spectrum and the secondary frequency spectrum. A rule in the second predefined set of rules may be to select consecutive available channels in each of the primary frequency spectrum and the secondary frequency spectrum. Additionally, a rule in the second predefined set of rules may be to avoid selection of an available channel in the secondary frequency spectrum if the available channel is surrounded by occupied channels.

The MS transceiver 310 communicates information corresponding to one or more available channels identified by the spectral sensing module 305 in the MS 110 to the master controller 105. The information corresponding to one or more available channels may include an available channel list. The master controller 105 in the MS 110 generates a channel hopping pattern based on the information and one or more available channels identified for one or more MSs in the PSCN 100. The MS transceiver 310 receives the channel hopping pattern from the master controller 105. Thereafter, based on the channel hopping pattern, the MS processor 315 generates a sequence of frequency hops for the MS 110. The sequence of frequency hops may be a pseudorandom sequence of frequencies. In an embodiment of the present invention the master controller 105 may generate an encrypted message that corresponds to the channel hopping pattern. The MS processor 315 uses the encrypted message to generate the sequence of frequency hops for the MS 110 using a third predefined set of rules. The third predefined set of rules is further explained in conjunction with FIG. 4. The encrypted message may include a generator polynomial which may be used by the MS Processor 315 for generating the sequence of frequency hops for the MS 110. Thereafter, the MS 110 hops one or more frequencies based on the sequence of frequency hops.

In an embodiment of the invention, the MS processor 315 may generate waveform modulation information based on the channel hopping pattern. The waveform modulation information may be generated using the encrypted message, if master controller 105 generates the encrypted message. The waveform modulation information may be used for modulating a transmission from the MS 110 on a frequency in the sequence of frequency hops.

Figure 4:
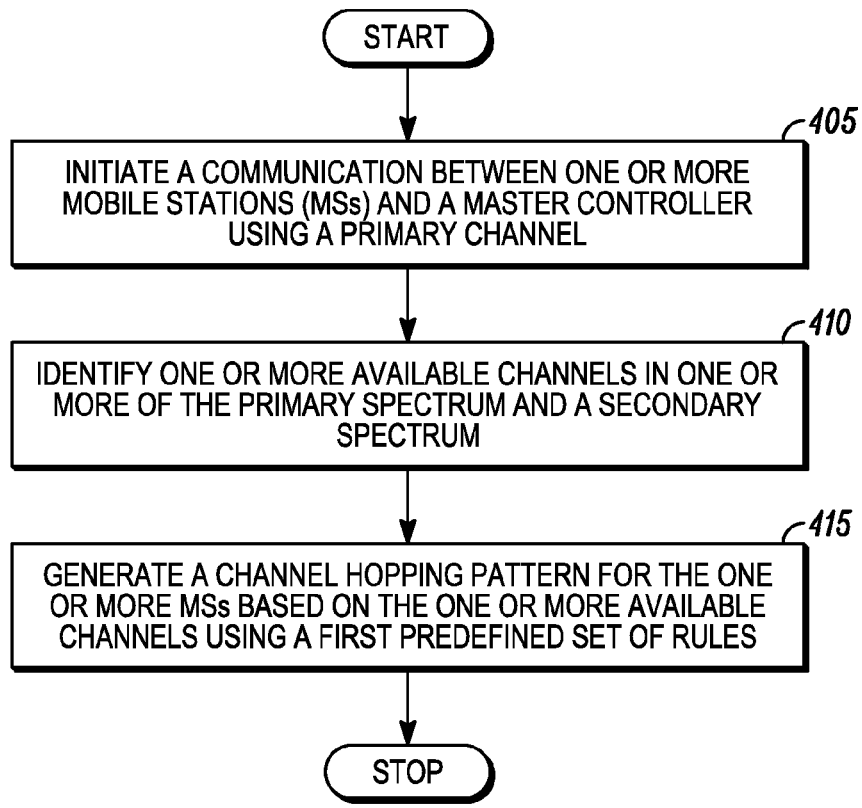
FIG. 4 is a flow diagram of a method of communication between one or more MSs and a master controller in a PSCN, in accordance with an embodiment of the invention.

FIG. 4 is a flow diagram of a method of communication between one or more MSs and the master controller 105 in the PSCN 100, in accordance with an embodiment of the invention. The master controller 105 initiates a communication with one or more MSs in the PSCN 100 using a primary channel at step 405. The primary channel corresponds to a primary frequency spectrum in the PSCN 100. A MS may initiate the communication in one or more scenarios, for example, when the MS enters the PSCN 100 or when the MS is switched on in the PSCN 100.

After initiating the communication, the master controller 105 may determine if each MS in the PSCN 100 is enabled to identify an available channel in one or more of the primary frequency spectrum and a secondary frequency spectrum of another service provider. This is further explained in detail in conjunction with FIG. 5. If each MS in the PSCN 100 is enabled to identify an available channel, the spectral sensing module 305 in each MS identifies one or more available channels in one or more of the primary frequency spectrum and the secondary frequency spectrum, at step 410. Each of the primary frequency spectrum and the secondary frequency spectrum includes one or more channels.

An available channel may be identified in response to a request from the master controller 105. The request may be sent when the master controller 105 initiates communication with one or more MSs. Alternatively, an available channel may be identified periodically after a predefined time interval. Further, an available channel may be identified based on an interference condition experienced by one or more MSs in the PSCN 100. For example, an available channel may be identified if interference in the primary frequency spectrum is high due to a large number of users.

At step 415, the master controller 105 generates a channel hopping pattern for one or more MSs in the PSCN 100 based on one or more available channels as identified. The channel hopping pattern corresponds to a sequence of frequency hops for a MS in the PSCN 100. The channel hopping pattern is generated using a first predefined set of rules. The first predefined set of rules has been explained in conjunction with FIG. 1. The master controller 105 may further generate waveform modulation information in addition to the channel hopping pattern. The channel hopping pattern may include the waveform modulation information. The waveform modulation information may be used by a MS to modulate a transmission from the MS on a frequency allotted to the MS in the channel hopping pattern.

The master controller 105 may generate an encrypted message corresponding to the channel hopping pattern. The master controller 105 transmits the encrypted message to each MS in the PSCN 100. The encrypted message is used by the MS processor 315 in each MS to generate a sequence of frequency hops for a corresponding MS using a third predefined set of rules. A rule in the third predefined set of rules may be using a generator polynomial in the encrypted message to generate a sequence of frequency hops by the MS processor 315 for the corresponding MS. Thereafter, each MS in the PSCN 100 hops one or more frequencies based on the channel hopping pattern using the corresponding sequence of frequency hops.

Figure 5:
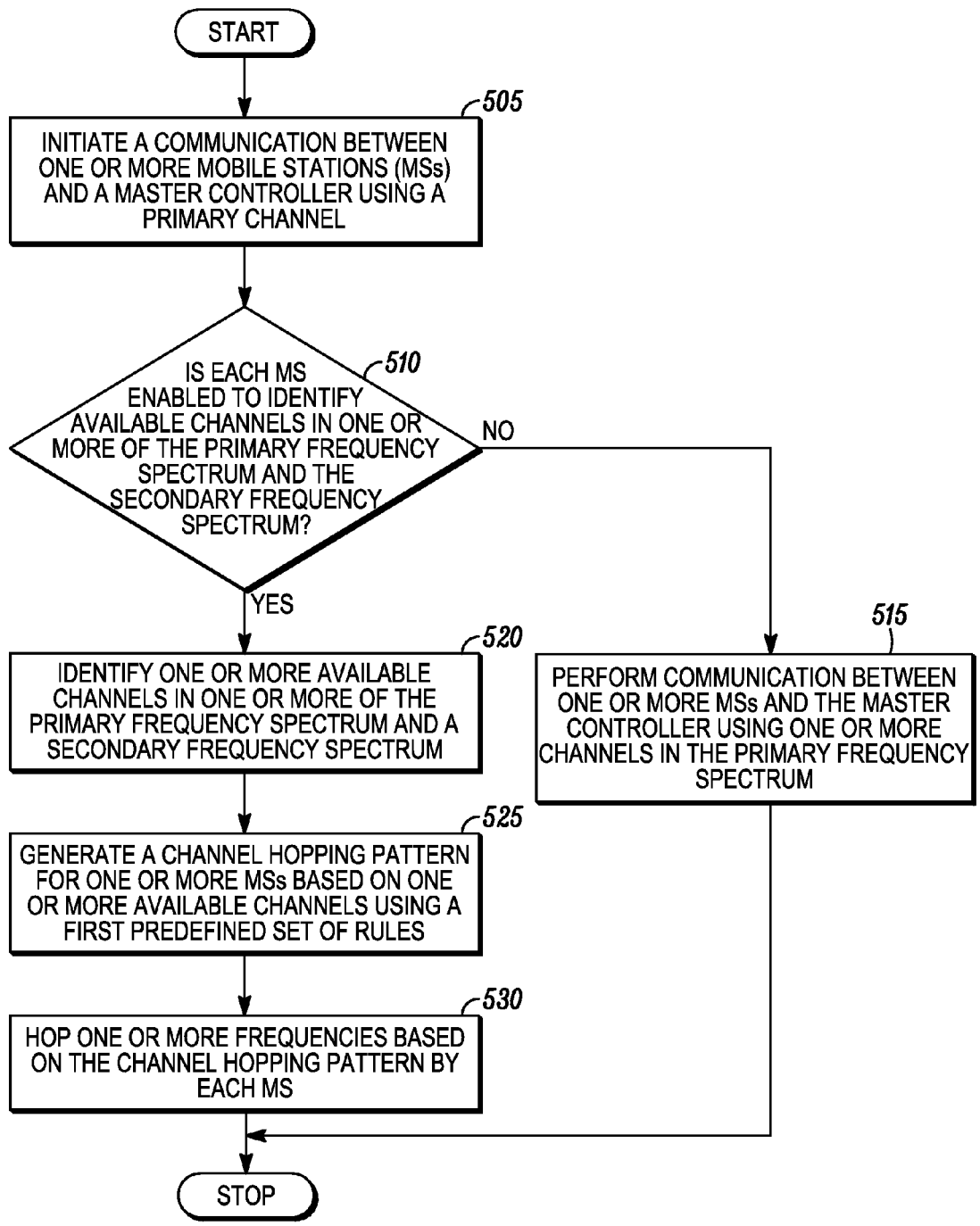
FIG. 5 is a flow diagram of a method of communication between one or more MSs and a master controller in a PSCN, in accordance with another embodiment of the invention.

FIG. 5 is a flow diagram of a method for communication in the PSCN 100, in accordance with another embodiment of the invention. The master controller 105 initiates a communication with one or more MSs in the PSCN 100 using a primary channel at step 505. The primary channel corresponds to a primary frequency spectrum in the PSCN 100.

Thereafter, at step 510, the master controller 105 performs a check to determine if each MS in the PSCN 100 is enabled to identify an available channel in one or more of the primary frequency spectrum and a secondary frequency spectrum of another service provider. Each of the primary frequency spectrum and the secondary frequency spectrum includes one or more channels. To this end, the master controller 105 may send a request message to each MS in the PSCN 100 to identify one or more available channels. A MS which is not enabled to identify an available channel may not be able to decipher the request message and, therefore, may not respond to the request message. Alternatively, the MS may return an error message to the master controller 105 if it is not enabled to identify an available channel. Therefore, in absence of a response to the request message or based on the error message, the master controller 105 may determine that the MS is not enabled to identify an available channel. In an embodiment of the invention, the master controller 105 may store information corresponding to the capability of one or more MSs to identify an available channel in the PSCN 100.

If one or more MSs in the PSCN 100 are not enabled to identify the available channels, a communication between one or more MSs and the master controller 105 is performed using the primary channel in the primary frequency spectrum, at step 515.

Referring back to step 510, if each MS in the PSCN 100 is enabled to identify an available channel, the spectral sensing module 305 in each MS identifies one or more available channels in one or more of the primary frequency spectrum and the secondary frequency spectrum, at step 520. In an embodiment of the invention, information corresponding to one or more available channels in the primary frequency spectrum may be stored in the master controller 105. Therefore, in this case, the spectral sensing module 305 in each MS identifies one or more available channels in the secondary frequency spectrum.

An available channel may be identified in response to a request from the master controller 105. The request may be sent when the master controller 105 initiates communication with one or more MSs. Alternatively, an available channel may be identified periodically after a predefined time interval.

Further, an available channel may be identified based on an interference condition experienced by one or more MSs. After identifying one or more channels, the MS transceiver 310 in each MS communicates the corresponding one or more available channels to the master controller 105.

In an embodiment of the present invention, the MS processor 315 in each MS may generate an available channel list using a second predefined set of rules. The available channel list includes a set of available channels. The second predefined set of rules has been explained in conjunction with FIG. 3. Thereafter, the MS transceiver 310 in each MS communicates the corresponding available channel list to the master controller 105.

At step 525, the master controller 105 generates a channel hopping pattern for one or more MSs in the PSCN 100 based on one or more available channels identified for each MS. The channel hopping pattern is generated using a first predefined set of rules. The channel hopping pattern corresponds to a sequence of frequency hops for a MS in the PSCN 100. The channel hopping pattern may include timestamp information. The timestamp information may be used by a MS to synchronize hopping with one or more MSs in the PSCN 100 such that the MS and one or more MSs may not hop to a same frequency at the same time.

The master controller 105 may further generate waveform modulation information in addition to the channel hopping pattern. The channel hopping pattern may include the waveform modulation information. The waveform modulation information may be used by a MS to modulate a transmission from the MS on a frequency allotted to the MS in the channel hopping pattern. Thereafter, the master controller 105 sends the channel hopping pattern to each MS in the PSCN 100 using the BTS transceiver 205.

The master controller 105 may generate an encrypted message corresponding to the channel hopping pattern. The master controller 105 transmits the encrypted message to each MS in the PSCN 100. The encrypted message is used by the MS processor 315 in each MS to generate a sequence of frequency hops for the corresponding MS using the third predefined set of rules. A rule in the third predefined set of rules may be using a generator polynomial in the encrypted message to generate a sequence of frequency hops by the MS processor 315 for the corresponding MS. The encrypted message may further include timestamp information. The timestamp information may be used by a MS to synchronize hopping with one or more MSs in the PSCN 100 such that the MS and one or more MSs may not hop to a same frequency at the same time. Further, at step 530, each MS in the PSCN 100 hops one or more frequencies based on the channel hopping pattern using a corresponding sequence of frequency hops.

Figure 6:
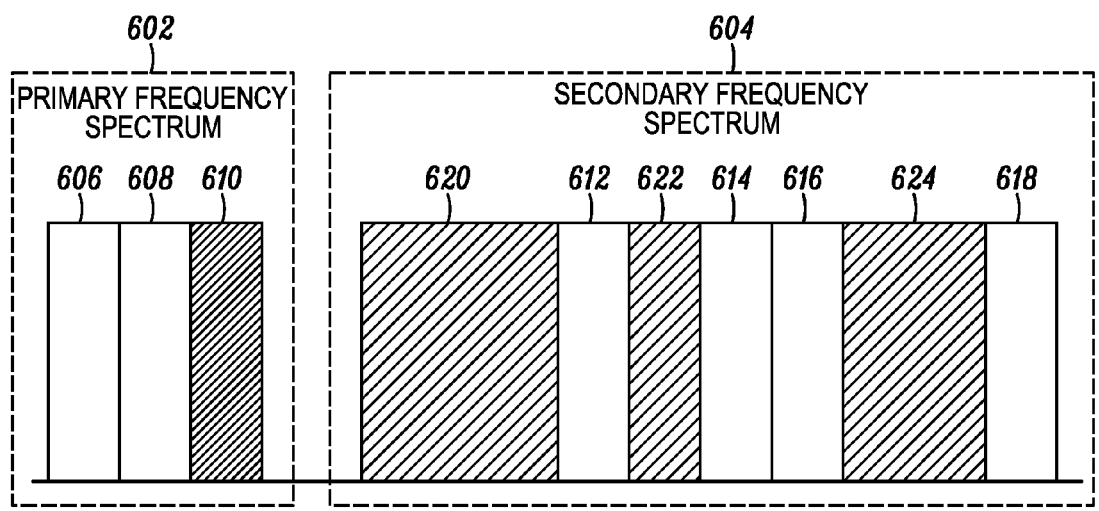
FIG. 6 is a block diagram showing generation of a channel hopping pattern for one or more MSs in a PSCN, in accordance with an exemplary embodiment of the invention.

FIG. 6 is a block diagram showing generation of a channel hopping pattern for one or more MSs in the PSCN 100, in accordance with an exemplary embodiment of the invention. The channel hopping pattern is generated using a primary frequency spectrum 602 and a secondary frequency spectrum 604 of another service provider. The primary frequency spectrum 602 includes a channel 606, a channel 608 and a channel 610. The secondary frequency spectrum 604 includes a channel 612, a channel 614, a channel 616 and a channel 618, which are unoccupied and a channel 620, a channel 622 and a channel 624, which are occupied.

Each of the MS 110 and the MS 115 in the PSCN 100 initiate a communication with the master controller 105 on the channel 610. The master controller 105 sends a request message to each of the MS 110 and the MS 115 for identifying one or more available channels in one or more of the primary frequency spectrum 602 and the secondary frequency spectrum 604. In response to the request message, the spectral sensing module 305 in the MS 110 identifies the channel 606 in the primary frequency spectrum 602 and the channel 612 and the channel 616 in the secondary frequency spectrum 604. Additionally, the spectral sensing module 305 in the MS 115 identifies the channel 606 and the channel 608 in the primary frequency spectrum 602 and the channel 614, the channel 616 and the channel 618 in the secondary frequency spectrum 604. The channel 610 in the primary frequency spectrum 602 and the channel 620, the channel 622, and the channel 624 in the secondary frequency spectrum 604 are occupied channels and therefore, are not identified.

After identification of available channels, the MS processor 315 of each of the MS 110 and the MS 115 may generate an available channel list using the second predefined set of rules. The second predefined set of rules has been explained in detail in conjunction with FIG. 3. The available channel list generated by the MS processor 315 of the MS 110 includes the channel 606 and the channel 616. Similarly, the available channel list generated by the MS processor 315 of the MS 115 includes the channel 606, the channel 608, the channel 614, the channel 616, and the channel 618. The channel 612 is not included in the available channel list based on the second predefined set of rules as it is surrounded by the channel 620 and channel 622, which are occupied channels.

Thereafter, the MS transceiver 310 of each of the MS 110 and the MS 115 sends the available channel list to the master controller 105. The master controller 105 generates a channel hopping pattern based on the available channel list received from each of the MS 110 and the MS 115 using the first predefined set of rules. The channel hopping pattern corresponds to a sequence of frequency hops for each of the MS 110 and the MS 115 in the PSCN 100. The channel hopping pattern for the MS 110 and the MS 115 is in the order: the channel 610, the channel 606, and the channel 616.

After generating the channel hopping pattern, the master controller 105 communicates the channel hopping pattern to each of the MS 110 and the MS 115. Based on the corresponding sequence of frequency hops in the channel hopping pattern, each of the MS 110 and the MS 115 starts hopping frequencies corresponding to the channel 610, the channel 606, and the channel 616. The use of channel hopping pattern under the first predefined set rules allows bandwidth of a channel in the primary frequency spectrum to be maintained constant.

Various embodiments of the invention provide method, system and apparatus for managing communication in a PSCN. The method, system and apparatus use frequency hopping for mitigating effects of intentional jamming in a PSCN. Additionally, interference in the PSCN is reduced by enabling MSs in the PSCN to hop frequencies in one or more of a primary frequency spectrum of the PSCN and a secondary frequency spectrum of another service provider. Also, frequency hopping in the secondary frequency spectrum enables frequency reuse in each of the primary frequency spectrum and the secondary frequency spectrum thereby optimizing communication.

In the foregoing specification, specific embodiments of the invention have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. In a public safety communication network having a plurality of Mobile Stations (MSs) and a master controller, a method of communication between at least one MS and the master controller, the method comprising:
   initiating a communication between the at least one MS and the master controller using a primary channel, wherein the primary channel corresponds to a primary frequency spectrum in the public safety communication network;
   identifying at least two available channels in at least one of the primary frequency spectrum and a secondary frequency spectrum, wherein each of the primary frequency spectrum and the secondary frequency spectrum comprise at least one channel;
   generating, at the master controller of the public safety communication network, a channel hopping pattern for the at least one MS based on the at least two available channels using a first predefined set of rules, wherein the channel hopping pattern corresponds to a sequence of frequency hops for a MS; and
   hopping at least one frequency, by the at least one MS, based on the sequence of frequency hops in the channel hopping pattern of the at least one MS.

2. The method of claim 1 further comprising:
   determining if each MS is enabled to identify an available channel in at least one of the primary frequency spectrum and the secondary frequency spectrum; and
   hopping at least one frequency by each MS based on the channel hopping pattern, if each MS is capable of identifying an available channel in at least one of the primary frequency spectrum and the secondary frequency spectrum.

3. The method of claim 1 further comprises generating an available channel list based on the at least two available channels using a second predefined set of rules.

4. The method of claim 1, wherein an available channel is identified by a MS enabled to identify an available channel in at least one of the primary frequency spectrum and the secondary frequency spectrum.

5. The method of claim 4, wherein an available channel is identified in response to a request from the master controller.

6. The method of claim 4, wherein an available channel is identified periodically after a predefined time interval.

7. The method of claim 4, wherein an available channel is identified based on an interference condition.

8. The method of claim 1, wherein a sequence of frequency hops for a MS is generated by the MS based on an encrypted message received from the master controller using a third predefined set of rules, the encrypted message corresponds to the channel hopping pattern.

9. The method of claim 1, wherein the channel hopping pattern comprises waveform modulation information, the waveform modulation information is used for modulating a transmission from the MS on a frequency allotted to the MS in the channel hopping pattern.

10. A Base Transceiver Station (BTS) for managing communication in a public safety communication network for at least one mobile station (MS), the BTS comprising:
    a BTS transceiver, operating within the public safety communication network, configured to receive information corresponding to at least two available channels from the at least one MS, wherein the at least two available channels are identified in at least one of a primary frequency spectrum and a secondary frequency spectrum; and
    a master controller operatively coupled to the BTS transceiver, wherein the master controller is configured to generate a channel hopping pattern for the at least one MS based on the at least two available channels using a first predefined set of rules, the channel hopping pattern corresponding to a sequence of frequency hops for a MS, wherein the at least one MS hops at least one frequency based on the sequence of frequency hops in the channel hopping pattern of the at least one MS.

11. The BTS of claim 10, wherein the BTS transceiver is further configured to communicate the channel hopping pattern to each MS.

12. The BTS of claim 10, wherein the Master controller is further configured to generate an encrypted message corresponding to the channel hopping pattern, wherein the encrypted message further includes timestamp information.

13. The BTS of claim 12, wherein the BTS transceiver is further configured to communicate the encrypted message to each MS, a MS uses the encrypted message to generate a sequence of frequency hops for the MS and to synchronize hopping with one or more MSs in the public safety communication network.

14. The BTS of claim 10, wherein the master controller is further configured to generate waveform modulation information, the waveform modulation information is used for modulating a transmission from a MS on a frequency allotted to the MS in the channel hopping pattern.

15. A Mobile Station (MS) for managing communication in a public safety communication network, the MS comprising:
    a spectral sensing module configured to identify at least two available channels in at least one of a primary frequency spectrum and a secondary frequency spectrum, wherein each of the primary frequency spectrum and the secondary frequency spectrum comprise at least one channel;
    a MS transceiver coupled with the spectral sensing module, wherein the MS transceiver is configured to:
       communicate information corresponding to the at least two available channels to a master controller operating within the public safety communication network; and
       receive a channel hopping pattern from the master controller, wherein the channel hopping pattern is generated by the master controller based on the information corresponding to the at least two available channels; and
    a MS processor operatively coupled to the MS transceiver, the MS processor configured to generate a sequence of frequency hops for the MS using the channel hopping pattern, wherein the MS hops at least one frequency based on the sequence of frequency hops in the channel hopping pattern of the MS.

16. The MS of claim 15, wherein the MS processor is further configured to generate an available channel list based on the at least two available channels using a second predefined set of rules.

17. The MS of claim 15, wherein the MS transceiver is further configured to initiate communication with the master controller on a primary channel, the primary channel corresponds to the primary frequency spectrum in the public safety communication network.

18. The MS of claim 15, wherein the MS processor is further configured to generate waveform modulation information, wherein the waveform modulation information is used for modulating a transmission from the MS on a frequency in the sequence of frequency hops.

19. The MS of claim 15, wherein the MS transceiver is further configured to receive an encrypted message from the master controller, wherein the encrypted message corresponds to the channel hopping pattern.

20. The MS of claim 19, wherein the MS processor is further configured to generate a sequence of frequency hops for the MS from the encrypted message based on a third predefined set of rules.

21. A Public Safety Communication Network (PSCN) comprising:
at least one MS, operating within the PSCN, wherein each MS is enabled to identify at least two available channel in at least one of a primary frequency spectrum and a secondary frequency spectrum, wherein each of the primary frequency spectrum and the secondary frequency spectrum comprise at least one channel; and
a master controller, operating within the PSCN, configured to generate a channel hopping pattern for the at least one MS based on the at least two available channels using a first predefined set of rules, wherein the channel hopping pattern corresponds to a sequence of frequency hops for a MS;
wherein the at least one MS hops at least one frequency based on the sequence of frequency hops in the channel hopping pattern of the at least one MS.

22. The PSCN of claim 21, wherein the master controller is further configured to determine if each of the at least one MS is enabled to identify an available channel in at least one of the primary frequency spectrum and the secondary frequency spectrum.

23. The PSCN of claim 21, wherein each of the at least one MS is configured to hop at least one frequency based on the channel hopping pattern, if each MS is capable of identifying an available channel in at least one of the primary frequency spectrum and the secondary frequency spectrum.

24. The PSCN of claim 21, wherein the master controller is further configured to generate an encrypted message, the encrypted message corresponds to the channel hopping pattern.

25. The PSCN of claim 21, wherein the master controller is further configured to generate waveform modulation information, the waveform modulation information used for modulating a transmission from a MS on a frequency allotted to the MS in the channel hopping pattern.

26. The PSCN of claim 21, wherein the primary frequency spectrum comprises a frequency spectrum of the PSCN and the secondary frequency spectrum comprises a frequency spectrum of another service provider.

27. The method of claim 8, wherein the encrypted message further comprises timestamp information, the timestamp information being used by the MS to synchronize hopping with one or more MSs.

28. The MS of claim 20, wherein the MS processor is further configured to synchronize hopping with one or more MSs in the public safety communication network using the encrypted message, wherein the encrypted message comprises timestamp information.

29. The PSCN of claim 24, wherein the at least one MS is further configured to synchronize hopping with one or more MSs in the PSCN using the encrypted message, the encrypted message including timestamp information.

* * * * *

UNITED STATES PATENT AND TRADEMARK OFFICE
CERTIFICATE OF CORRECTION

PATENT NO. : 8,300,673 B2
APPLICATION NO. : 11/844669
DATED : October 30, 2012
INVENTOR(S) : Hekmann et al.

Page 1 of 1

It is certified that error appears in the above-identified patent and that said Letters Patent is hereby corrected as shown below:

In Column 10, Line 18, in Claim 12, delete "Master" and insert -- master --, therefor.

In Column 11, Line 16, in Claim 21, delete "channel" and insert -- channels --, therefor.

Signed and Sealed this
Twelfth Day of February, 2013

Teresa Stanek Rea
*Acting Director of the United States Patent and Trademark Office*